Sept. 18, 1934.   R. B. BUKOLT   1,973,747
ROLLER BEARING WHEEL
Filed Oct. 27, 1928

INVENTOR.
Roman B. Bukolt
BY
Erwin, Wheeler & Woolard
ATTORNEYS

Patented Sept. 18, 1934

1,973,747

UNITED STATES PATENT OFFICE 1,973,747

ROLLER BEARING WHEEL

Roman B. Bukolt, Stevens Point, Wis.

Application October 27, 1928, Serial No. 315,581

1 Claim. (Cl. 301—63)

This invention relates to roller bearing wheels.

It is the object of this invention to provide a novel and improved roller bearing unit and a novel and improved assembly of such unit in a wheel for the purpose of effecting economy of manufacture and a more satisfactorily operable construction than has heretofore been available.

In roller bearing wheels of the type to which this invention relates it has been customary to provide elongated rollers extending completely through the hub of the wheel. When used in disk wheels such rollers have been mounted in bearing elements unconnected save through the opposing disks comprising the wheel and any distortion of the wheel has made possible the dis-arrangement of the bearing. I have found that it is not only less expensive but far more practicable to provide separate roller units in which the rollers are of short length and are closely confined by bearing members rigidly connected with each other.

Further economies are effected through standardization which is made possible by the fact that the roller units may be used in various forms of wheels irrespective of the spacing between disks at the hub of the wheel. The units may also be fastened to the disk in a number of different ways to suit the particular designs of the manufacturer of such wheels and may be supplied as separate articles of manufacture either assembled or disassembled. The units, furthermore, lend themselves to use in wire wheels without change other than the provision of apertures to receive the spokes of such wheels. A single unit serves in both left and right hand locations and is adapted in any location to receive and retain a hub cap.

In the drawing—

Like parts are identified by similar reference numerals throughout the several views.

Figure 1:
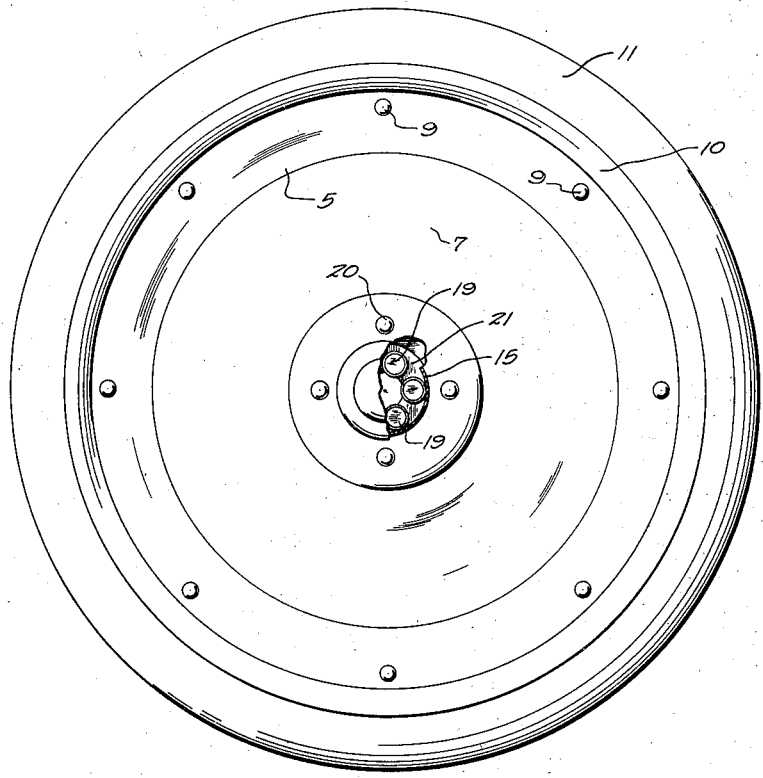
Figure 1 is a side elevation of a wheel embodying this invention, the hub cap and a portion of the bearing unit race being broken away to expose the rollers therein.
Figure 2:
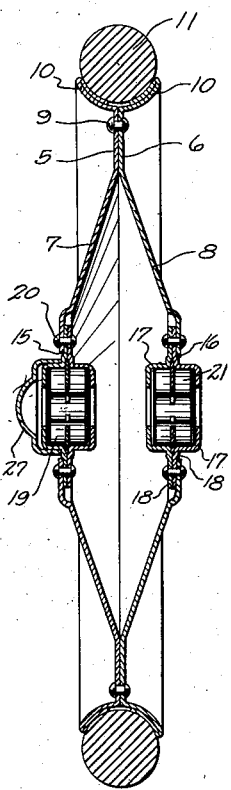
Figure 2 is an axial vertical section through the wheel shown in Figure 1.

The wheels herein disclosed are particularly adapted for toy vehicles but have a much wider application. Referring to Figures 1 and 2 it will be noted that these views illustrate a disk wheel comprising the individual sheet metal disks or plates 5 and 6 oppositely dished or axially distorted at 7 and 8 respectively for strength. The two disks are riveted together at 9 and provided at 10 with opposing flanges adapted to receive the tire 11. Registering apertures are provided in the centers of the respective disks at 15 and 16 to receive an axle shaft and the bearing means hereinafter to be described.

In accordance with this invention, each of the component disk members 5 and 6 comprising the wheel is separately provided with an individual bearing unit. The units are identical. Each consists of a pair of centrally apertured cups 17, each having a radial flange 18 at its margin. The two cups together provide a bearing race into which the rollers 19 are inserted in annular series. The cup flanges are then riveted or welded together at 20. The rollers may be inserted in one of the cups before the other is fastened thereto and are held in properly spaced relation by means of a disk 21 confined between the flanges 18 of the cups 17 and having apertures to engage and position the central portions of the rollers.

The same rivets used to secure the bearing cups 17 together may be used to secure the bearing unit to the hub portion of either disk 5 or 6, as disclosed particularly in Figure 2. It will be obvious that in such case a single riveting operation will secure together the component parts of the bearing unit and will fix such unit in place in the wheel. It will further be obvious that it is broadly immaterial whether the flanges of the bearing unit are disposed within the disk, as shown in Figure 2, or on the outside face of the disk or whether the disk is received between such flanges, as shown in Figure 3.

Figure 3:
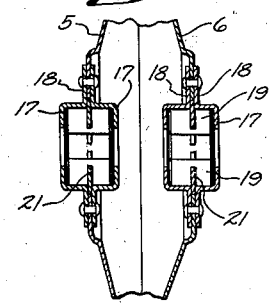
Figure 3 is a detail showing a slightly modified application of the parts of the bearing unit to the wheel.

It may be observed, however, that in the construction shown in Figures 1 and 2 the load is transmitted directly from the inner periphery of the disk to the shoulder formed on flange 18 within which the skeleton cage 21 is housed, the rivets performing the sole function of securing the parts together; whereas in the Figure 3 construction, the entire load is transmitted through the rivets. It is preferred therefore, to have the margin of the disk fitted to the outer periphery of the cup-shaped race member of the unit and engaged either with the inner member or with the outer member, as suggested in Figure 2.

It is also to be observed that in the Figure 3 construction, the spacing cage disk 21 is approximately equal in thickness to the disks 5 and 6 of the wheel and hence it is not necessary to shoulder or emboss flanges 18 to receive the cage disk 21, as in the constructions shown in the remaining views.

Figure 4:
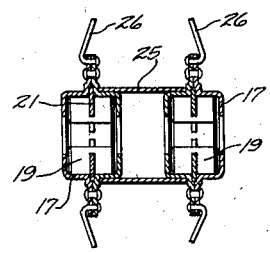
Figure 4 is a detail showing how the same units may be incorporated in a wire wheel.

Figure 4 shows the identical units above described used to provide a hub for a wire wheel. A spacing sleeve 25 slips over the cup portions of the inner race members of the respective bearing units and the flanges of such units are apertured adjacent their peripheries to receive the usual spokes 26. Except for these apertures the units are identical with those previously described and it will be observed that the provision of the apertures will in no wise alter the functioning of units employed in a disk wheel so that if desired a manufacturer may make up these units in quantities and use them in either type of wheel which is in production at the time.

The component race members of the bearing units may be drawn, stamped, or spun and in any event will generally have a very slight taper from the base of the cup toward its margin. Due to this fact, the sleeve 25 will have a tight frictional engagement with the respective units and will, of course, additionally be retained by the tension on spokes 26. The taper above referred to, however, has a further utility in both types of wheels in that it is adapted to receive and frictionally retain a hub cap such as that shown at 27. Due to the fact that left and right units are identical, the hub cap is freely interchangeable between the exposed cup members at either side of the wheel and the wheel may be used in any location upon a toy vehicle or other vehicle in which the bearing structure is employed.

I claim:

In a wheel of the class described, the combination with a rim and radial extending members connected with said rim and axially spaced near the center of the wheel, of identical bearing units connected with the respective members in axially spaced alignment, each of said units comprising a pair of identical sheet metal cups having axial openings therein and radial marginal flanges juxtaposed and connected externally of the bearing units with said members and with each other, and said bearing units constituting a bearing race with approximately cylindrical portions in alignment and each being tapered slightly in external diameter for the frictional retention of a complementary part externally applied thereto.

ROMAN B. BUKOLT.